Feb. 19, 1924. 1,484,216
M. J. HEKKING
FLANGED PIPE OR HOSE CONNECTION
Filed May 19, 1922
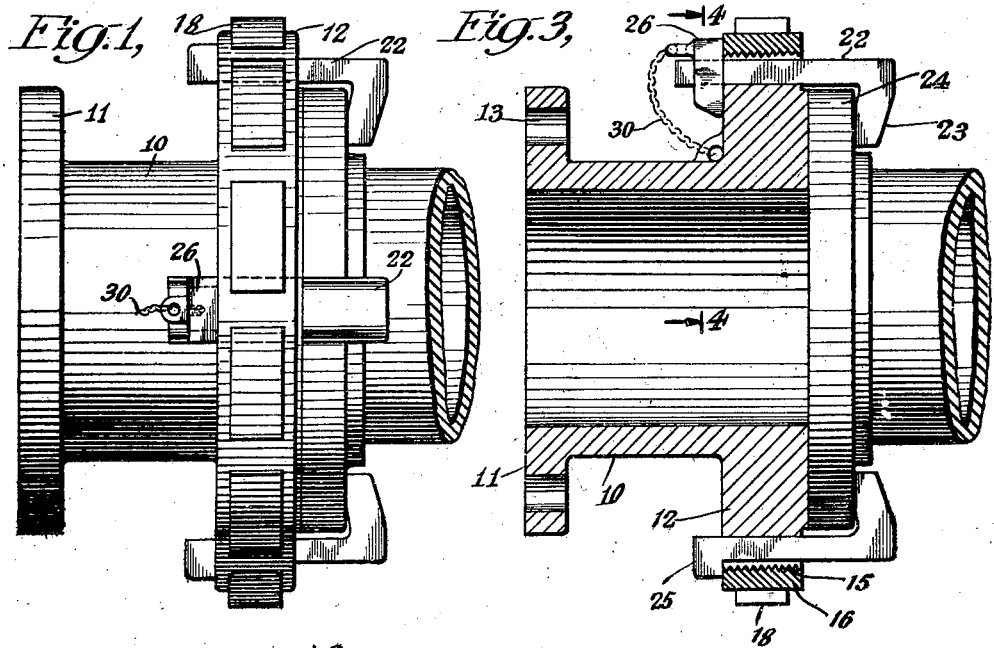
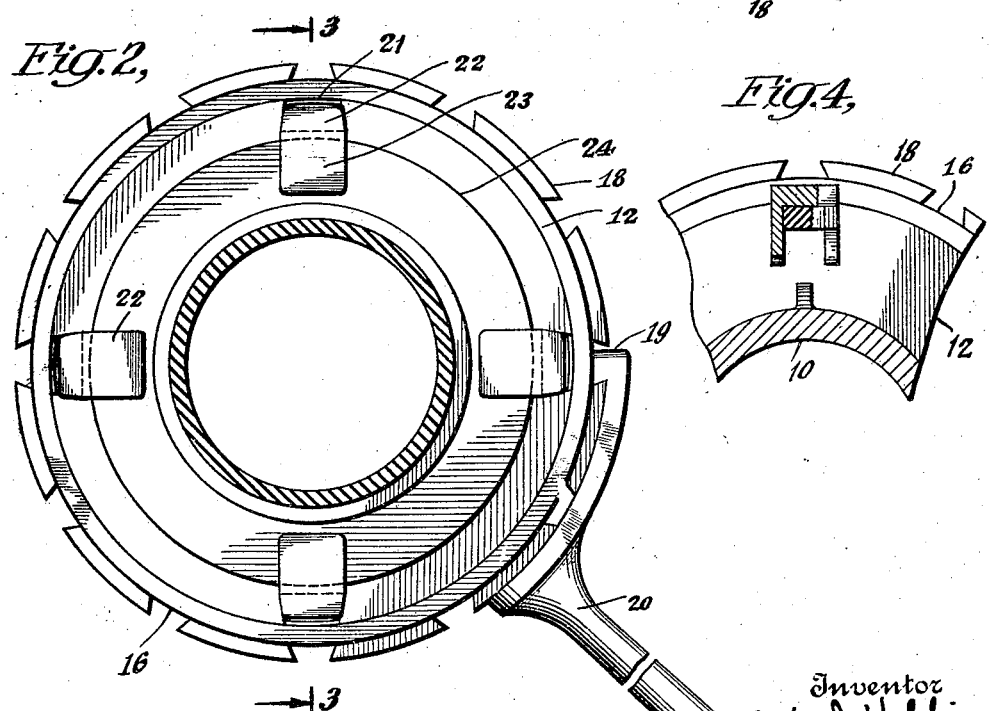
Inventor
Martin J. Hekking
By his Attorney Patented Feb. 19, 1924.

1,484,216

UNITED STATES PATENT OFFICE.

MARTIN J. HEKKING, OF BROOKLYN, NEW YORK.

FLANGED PIPE OR HOSE CONNECTION.

Application filed May 19, 1922. Serial No. 562,066.

*To all whom it may concern:*

Be it known that I, MARTIN J. HEKKING, a citizen of the United States of America, and a resident of Brooklyn, county of Kings, and State of New York, have invented certain new and useful Improvements in Flanged Pipe or Hose Connections, of which the following is a specification, reference being had to the accompanying drawings, forming a part thereof.

My invention relates to hose or pipe couplings, and it has for one object to provide a simple and improved coupling for this general purpose that shall enable hose or pipe sections of either like or unlike sizes, to be very quickly and easily coupled or uncoupled.

My invention is capable of a wide variety of uses, but is particularly designed and adapted for attaching and detaching flanged hose or pipe such as are utilized by oil companies as part of their equipment at terminals, filling stations, and on tank steamers, barges and the like.

My invention has the advantage of avoiding the necessity of bolting and unbolting the usual flanged connections for supplying boats with fuel and loading and unloading liquid cargoes. Moreover, my invention is adapted to couple pipes of unlike size, and is adapted to cooperate with the standard flanges now in use on such parts.

Other objects and advantages of my invention will be set forth hereinafter, and I will now describe the same with reference to the drawings and point out the novel features thereof in the appended claims.

Referring to the drawings, Figure 1 is a view in side elevation of a pipe coupling arranged and constructed in accordance with my invention and constituting one embodiment thereof.

Figure 2 is a view in end elevation of the same coupling with one of the pipes broken away and shown in section.

Figure 3 is a view of a longitudinal section of the coupling, taken on the line 3—3 of Figure 2.

Figure 4 is a partially sectional detail view, taken on the line 4—4 of Figure 3.

The pipe or hose connection shown in the drawings, comprises a body 10 of cast steel or other suitable material, having an ordinary pipe flange 11 at one end and a larger coupling flange 12 at the opposite end. The flange 11 is provided with bolt holes 13 and is adapted to be permanently coupled to a corresponding flange on the oil header or connection on board a tank ship or at a shore station.

The flange 12 has its periphery screw-threaded, preferably by a fine thread, as shown at 15 to cooperate with a clamping ring or nut 16 which is correspondingly threaded on its interior surface. The nut 16 has dovetail-shaped notches 18 on its exterior which are adapted to be engaged by the hook 19 of a spanner wrench 20, which is used for tightening and loosening the nut. The flange 12 has a plurality of slots 21 through which clamping jaws 22 extend and each of the jaws has an inwardly extending lug 23 which is adapted to engage the ordinary flange such as 24 of the pipe or hose which is to be coupled to the connection, and an outwardly extending finger 25 which is adapted to be engaged by the clamping nut 16.

At least one of the jaws 22 has a removable key 26 which extends through a slot or opening 27 in the jaw, and takes the place of the outwardly extending finger 25. The removable key is preferably connected to the body 10 by a chain 30 to avoid the possibility of its being lost. The jaw which has the removable key is obviously removable when the key is extracted and it may be attached to the body by a chain or other flexible connection, if desired.

The operation of the device is as follows: In making a coupling, assuming that the clamping nut is somewhat loosened, the removable jaw is temporarily taken out, thus permitting the flange 24 of the hose to be set into the other jaws. The removable jaw is then set in position and the key 26 inserted. It is then only necessary to turn the nut by the spanner wrench 20, so as to tighten the jaws.

It is evident that any suitable number of jaws may be employed and that one or more of them may be removable to permit the flange of the hose or pipe being coupled to be set in position.

From the foregoing description, it will be readily understood that the connection can be uncoupled as quickly and as easily as it can be coupled.

A structure of preferred form and construction has been illustrated and described for the purpose of showing a way in which this invention may be used, but the inventive thought upon which this application is based is broader than this illustrative embodiment thereof, and I therefore intend no limitation other than those imposed by the appended claims.

What I claim is:—

1. A connection or coupling comprising a member having a notched flange with its periphery screw-threaded, jaws mounted in the notches of the flange and adapted to engage the flange of a cooperating member, and a clamping nut screwed onto the periphery of the flange, and adapted to tighten the jaws.

2. A flanged pipe or hose connection, comprising a spool having a circumferentially screw-threaded flange, with radial slots therein, clamping jaws mounted in the slots and each having an inwardly extending clamping lug adapted to engage the connecting flange, and an outwardly extending finger on the opposite end, a screw-threaded clamping nut mounted on the periphery of the flange an dcooperating with the fingers of the jaws.

3. A flanged pipe or hose connection, comprising a spool having a circumferentially screw-threaded flange, with radial slots therein, clamping jaws mounted in the slots and each having an inwardly extending clamping lug adapted to engage the connecting flange, and an outwardly extending finger on the opposite end, a screw-threaded clamping nut mounted on the periphery of the flange and cooperating with the fingers of the jaws, the finger on one or more of the jaws being in the form of a removable key.

4. A connection or coupling comprising a notched annular flange, a plurality of jaws in the notches and a clamping ring engaging all the jaws, one or more of said jaws being provided with removable means for cooperating with the ring.

5. A coupling adapted to secure together flanged pipes of like or unlike diameters comprising a member having a notched annular flange, gripping members mounted in the notches of the flange and adapted to engage the flange of a cooperating member, and an adjustable annular member threadedly secured on the periphery of the first named flange for tightening the jaws.

In witness whereof I have hereunto set my hand this 15th day of May, 1922.

MARTIN J. HEKKING.